United States Patent [19]
Ota

[11] Patent Number: 6,055,279
[45] Date of Patent: Apr. 25, 2000

[54] BURST MODE DIGITAL OPTICAL RECEIVER

[75] Inventor: Yusuke Ota, Mountain Lakes, N.J.

[73] Assignee: Lucent Technologies Inc., Murray Hill, N.J.

[21] Appl. No.: 09/156,717

[22] Filed: Sep. 18, 1998

Related U.S. Application Data

[62] Division of application No. 08/818,056, Mar. 14, 1997, Pat. No. 5,875,050.

[51] Int. Cl.$^7$ .............................. H04L 25/06; H04B 10/06
[52] U.S. Cl. ........................... 375/319; 375/317; 359/189
[58] Field of Search .................................... 375/318, 319, 375/317; 359/189, 333, 264, 194; 330/252, 254, 152, 282; 250/214 A; 327/52, 89, 359

[56] References Cited

U.S. PATENT DOCUMENTS

| | | | |
|---|---|---|---|
| 4,375,037 | 2/1983 | Ikushima ................................. | 375/318 |
| 5,119,404 | 6/1992 | Aihara ..................................... | 375/318 |
| 5,475,342 | 12/1995 | Nakamura et al. ..................... | 330/136 |
| 5,546,211 | 8/1996 | Devon ..................................... | 359/154 |
| 5,790,295 | 8/1998 | Devon ..................................... | 359/189 |
| 5,818,620 | 10/1998 | Akimoto et al. ........................ | 359/189 |
| 5,822,104 | 10/1998 | Saito ....................................... | 359/189 |
| 5,852,333 | 12/1998 | Strojny et al. ............................ | 307/87 |
| 5,875,049 | 2/1999 | Asano et al. ............................ | 359/189 |

FOREIGN PATENT DOCUMENTS 2 156 621  10/1985  United Kingdom ............. H04B 9/00

OTHER PUBLICATIONS

Patent Abstracts of Japan; vol. 006, No. 243 (E–145); Dec. 2, 1982 & JP 57 141160A(Tokyo Shibaura Denki KK), Sep. 1, 1982.

Yusuke Ota et al., "DC–1Gb/s Burst–Mode Compatible Receiver For Optical Bus Applications", *Journal of Lightwave Technology*, vol. 10, No. 2, Feb. 1, 1992, pp. 244–249, XP000267495.

European Search Report Application No. EP 9830547.0, Jun. 18, 1998.

*Primary Examiner*—Tesfaldet Bocure
*Assistant Examiner*—Khai Tran
*Attorney, Agent, or Firm*—Eugene J. Rosenthal

[57] ABSTRACT

A DC coupled burst mode optical receiver circuit having improved sensitivity and improved dynamic range. The output of the receiver's photodiode is single endedly amplified by a main preamplifier and the main preamplifier's output is then converted, using an operational amplifier, e.g., with a gain of 1, to a differential signal which swings symmetrically around a threshold level. More specifically, the output of the main preamplifier is connected to one input of the operational amplifier. The output of a tracking preamplifier, which is identical to the main preamplifier, is coupled to the other input of the operational amplifier. The output of the tracking preamplifier is used to match the DC voltage of the main preamplifier, e.g., by being noise-free and by tracking changes in supply voltage, temperature, and the like. It is used to set the DC reference voltage for the standard operational amplifier functions. Between one output of the operational amplifier and the opposite sign input thereof is connected an automatic threshold controller (ATC). The ATC insures that the threshold level for determining the value of the logic value of the received signal is at the middle of the signal supplied from the main preamplifier. Preferably, the main preamplifier, the tracking preamplifier, the operational amplifier and the ATC are manufactured on a single integrated circuit. Optionally, a transimpedance resistor of both the main preamplifier and the tracking preamplifier are clamped to a predetermined maximum level, e.g., using a high-speed Schottkey diode, to enhance the dynamic range of the receiver.

15 Claims, 1 Drawing Sheet

BURST MODE DIGITAL OPTICAL RECEIVER

This application is a divisional of application Ser. No. 08/818,056, filed on Mar. 14, 1997, now U.S. Pat. No. 5,875,050.

TECHNICAL FIELD

This invention relates to digital optical communication, and in particular, to digital optical communication in which burst-mode transmission may be carried out.

BACKGROUND OF THE INVENTION

A well known problem in the art of digital optical communication was an inability to use burst-mode transmission, i.e., a direct unencoded transmission of data in which the data desired to be transmitted is allowed to have long strings of only ones or long strings of only zeros. This was because, for proper operation of the receiver, the non-transition period, i.e., the length of time between changes in the optical signal, had to have been be small relative to the time constant determined by the capacitance for coupling between a) a preamplifier of an electrically-converted version of the optical signal and b) a comparator which is used to determine the logic value, i.e., 1 or 0, of the incoming optical signal. As a result, an optical signal with a guaranteed maximum transition spacing had to be essentially constantly transmitted, which required that the data to be transmitted be encoded. Disadvantageously, doing so mandated that a decoder be present in the receiving system to remove the formatting and reconstruct the original data. Also, data transmission efficiency was degraded because of the required extra bits for the encoding.

Previously, it was recognized that the foregoing disadvantages resulted from the design of prior art optical receivers, which employed alternating current (AC) coupling between the optical preamplifier and the comparator. While such AC coupling is not always needed in electrical communication systems, it was believed to be required in optical systems, because there is no common electrical connection between the transmitter and the receiver. Nevertheless, eventually the above-noted disadvantages were overcome by burst-mode digital optical receivers which use direct current (DC) coupling. Such DC coupled burst-mode digital optical receivers are disclosed in U.S. Pat. Nos. 5,025,456, 5,430,766, and 5,371,763 issued to myself and R. G. Swartz, which are incorporated herein by reference. Such DC coupled optical receivers used a different approach than other prior art receivers, essentially unifying the preamplifier and the comparator, and making use of an automatic threshold controller (ATC). However, such an approach has the disadvantage of doubling the preamplifier noise, i.e., there is an inherent 3 dB noise penalty.

SUMMARY OF THE INVENTION

The invention is a circuit which employs DC coupling between a preamplifier and a comparator of an optical burst mode receiver while avoiding the 3 dB noise penalty of prior art DC coupled burst mode receivers so as to achieve greatly improved sensitivity. In addition, in accordance with an aspect of the invention, improved dynamic range is also obtained.

In one embodiment of the invention, the output of the receiver's photodiode is single-endedly amplified by a main preamplifier, and the amplified output is then converted, using an operational amplifier, e.g., with a gain of 1, to a differential signal which swings symmetrically around a threshold level. The differential signal may then converted to a standard logic output, e.g., a single-ended logic, such as transistor-transistor logic (TTL) or a differential logic, such as emitter coupled logic (ECL).

More specifically, the output current of the receiver's photodiode is converted to an amplified voltage signal by the main preamplifier. The output of the main preamplifier is connected to one input of the operational amplifier.

In accordance with an aspect of the invention, the output of another preamplifier, a so-called "tracking" preamplifier, which is identical to the main preamplifier, is coupled to the other input of the operational amplifier. The output of the tracking preamplifier is used to match the DC voltage of the main preamplifier, and the matching voltage is used to set the DC reference voltage for the standard operational amplifier functions. In particular, the tracking preamplifier tracks changes in supply voltage, temperature, and the like which affect the main preamplifier. Also, both the input and the output of the tracking preamplifier are AC filtered, to suppress any AC signal, so that the tracking preamplifier provides a substantially noise-free reference voltage.

Between one output of the operational amplifier and the opposite sign input thereof is connected an automatic threshold controller (ATC). The ATC insures that the threshold level for determining the value of the logic value of the received signal is at the middle of the signal supplied from the main preamplifier.

Preferably, the main preamplifier, the tracking preamplifier, the operational amplifier and the ATC are manufactured on a single integrated circuit. Optionally, in accordance with an aspect of the invention, a transimpedance resistor of both the main preamplifier and the tracking preamplifier are clamped to a predetermined maximum level, e.g., using a high-speed Schottkey diode so as to improve the receiver's dynamic range.

DETAILED DESCRIPTION

Figure 1:
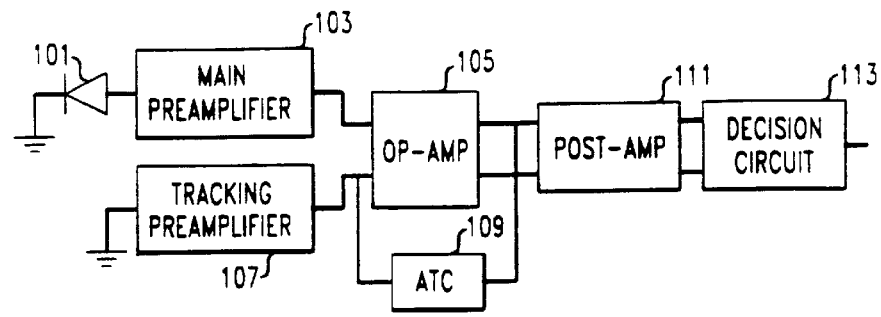
FIG. 1 shows a block diagram view of an exemplary circuit which is arranged, in accordance with the principles of the invention so as to provide DC coupling between a preamplifier and a comparator.

FIG. 1 shows a block diagram view of an exemplary circuit which is arranged, in accordance with the principles of the invention so as to provide DC coupling between a preamplifier of an electrically-converted optical signal and a comparator used to determine whether the electrically-converted optical signal represents a one or a zero. Advantageously, the circuit shown does not suffer from the 3 dB noise penalty of prior art DC coupled burst mode receivers, and thus has greatly improved sensitivity. In addition, in accordance with an aspect of the invention, the circuit of FIG. 1 provides improved dynamic range over the prior art.

The circuit of FIG. 1 includes a) photodiode 101, b) main preamplifier 103, c) operational amplifier (op-amp) 105, d) tracking preamplifier 107, e) automatic threshold controller (ATC) 109, f) post-amp 111 and g) decision circuit 113.

Photodiode 101 receives an optical signal, e.g., from an optical fiber, and converts such signal into an electrical signal. In contrast to conventional so-called "continuous"-type signals, which encode the data being transmitted to insure that a transition from zero to one or one to zero always occurs within a predetermined time period, the optical signal supplied to photodiode 101 may be a "bursty" signal, i.e., a signal that has long strings of only ones or long strings of only zeros, because there is no requirement to that a transition be introduced at any time. Advantageously, by not having to encode the data, the throughput of the system is improved.

The electrical signal is then amplified by main preamplifier 103, which is preferably a single-ended high sensitivity transimpedance amplifier. The amplified output from main preamplifier 103 is supplied to op-amp 105. A coupling capacitor is not required, i.e., the output of the preamplifier is DC coupled to op-amp 105. However, to ensure accurate detection of the value of the electrically-converted optical signal, it is necessary that the DC level caused by the signal supplied from main preamplifier 103 to one input of op-amp 105 be precisely matched at the other input of main preamplifier 103.

To achieve such a matching, tracking preamplifier 107 is employed. Tracking preamplifier 107 is substantially identical to main preamplifier 103 and is preferably manufactured on the same integrated circuit as main preamplifier 103. It is coupled to the opposite sign terminal of op-amp 105 as is main preamplifier 103. The input to tracking preamplifier 107 is filtered so as to have minimal noise. As a result, the DC level output by tracking preamplifier 107, which is also filtered to be certain that there is substantially no AC noise thereat, will be an extremely good match for the DC level output by main preamplifier 103. The output of tracking preamplifier 107 is fed to the opposite-sign input of op-amp 105, which thus consistently tracks the DC level of main preamplifier 103.

Op-amp 105 is used convert the signal supplied as an output by main preamplifier 103 to a differential signal which swings symmetrically around a threshold level. The gain of op-amp 105 is preferably set to one.

Automatic threshold controller (ATC) 109 is connected between one output, e.g., the positive (+) output terminal, of the operational amplifier and its opposite sign input, e.g., the negative (−) input terminal. ATC 109 is used to establish a proper logic threshold level to determine whether the electrically-converted optical signal represents a "1" or a "0". More specifically, it functions to insure that the threshold level used for determining the value of the data has a value that is at the middle of the signal input to op-amp 105, to prevent pulse-width distortion in the logic output. This may be achieved by storing the amplitude output from one of outputs of op-amp 105 and negatively feeding back the stored value to the opposite sign op-amp 105 input terminal. ATC 109 may be operated so that amplitude information is newly stored each time a new packet arrives. The changing of the value stored in ATC 109 may be performed by resetting it.

In addition to it being preferable to manufacture main preamplifier 103 and tracking amplifier 107 on the same integrated circuit, as noted above, it is also preferable that op-amp 105 and ATC 109 are manufactured on the same single integrated circuit. This is so that the effects of fluctuations in power supply voltage and ambient temperature changes are minimized.

The differential outputs from op-amp 105 are amplified by differential post-amplifier (post-amp) 111. The amplified differential output from post-amp 111 is DC coupled to decision circuit 113, which converts the differential signal to a one or a zero as a standard logic level signal, which is supplied as an output.

Figure 2:
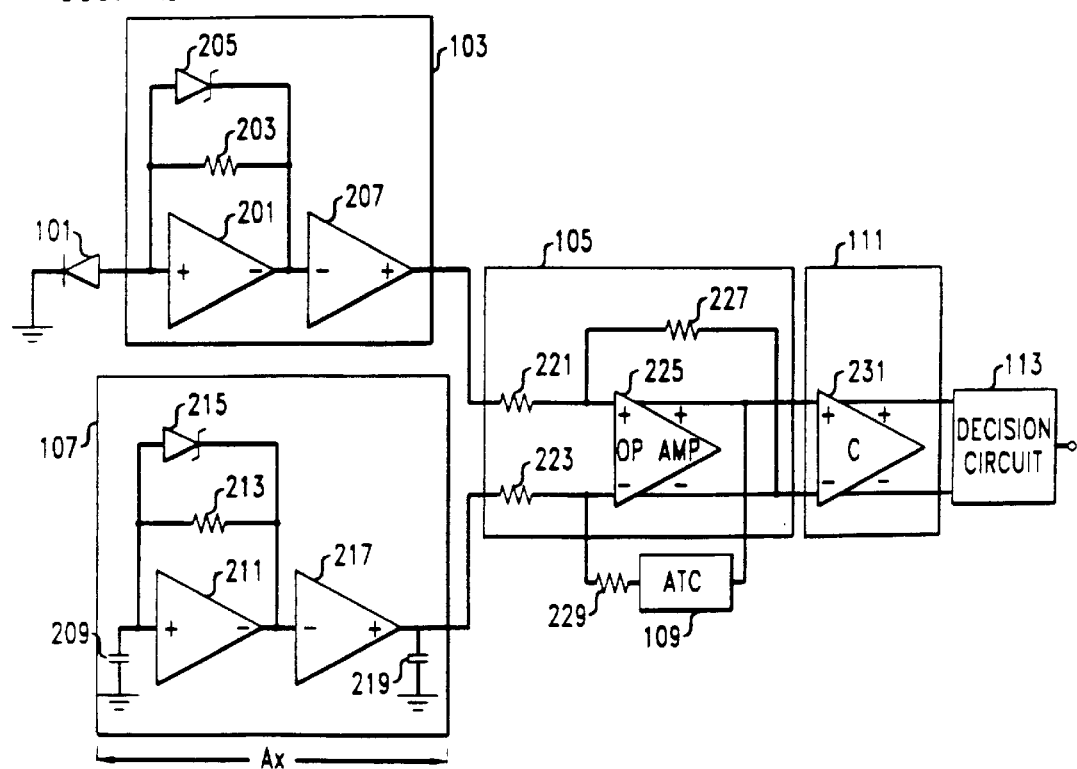
FIG. 2 shows another view of the circuit of FIG. 1, with additional details shown within most of the blocks of FIG. 1.

FIG. 2 shows another view of the circuit of FIG. 1, with additional details shown within most of the blocks of FIG. 1. Thus, main preamplifier 103 includes amplifier 201 configured in a transimpedance configuration having a parallel combination of impedance 203 and high-speed Schottkey diode 205 in the feedback path. Schottkey diode 205 operates to limit the swing in amplitude of the amplified signal that appears across impedance 203. Doing so allows the input to main preamplifier 103, which is the output from photodiode 101, to have a greater dynamic range. Thus, the dynamic range of optical signals which can be received by the circuit of FIG. 1 is significantly greater than the dynamic range than prior art receivers. Main preamplifier 103 also includes amplifier 207.

As described above, tracking preamplifier 107 is designed to be substantially identical to main preamplifier 103. To this end, it contains amplifier 211 configured in a transimpedance configuration having a parallel combination of impedance 213 and high-speed Schottkey diode 215 in the feedback path followed by amplifier 217. Impedance 213 is set to match impedance 203 and high-speed Schottkey diode 215 is designed to be substantially identical to Schottkey diode 205. In order to eliminate any noise, i.e., AC component, the input to amplifier 211 is filtered, e.g., bypassed to ground via capacitor 209. Amplifier 217 is substantially identical to amplifier 207, but its output is filtered by capacitor 219 to eliminate any AC noise.

The output of main preamplifier 103 is connected to resistor 221, while the output of tracking preamplifier 107 is connected to resistor 223. Resistors 221 and 223 are the DC input resistors of op-amp 105, and they are substantially identical, so as to ensure that the DC level at each of the inputs of op-amp 105 is the same.

The input of ATC 109 is connected to the positive output of op-amp 225, while the output of ATC 109 is connected to the negative input of op-amp 225 via resistor 229. Thus, resistor 229 is the AC input resistor for the negative input of op-amp 225. Preferably, the value of resistor 229 is the same as that of resistors 221 and 223.

The foregoing merely illustrates the principles of the inventions. It will thus be appreciated that those skilled in the art will be able to devise various arrangements which, although not explicitly described or shown herein, embody the principles of the invention and are included within its spirit and scope.

What is claimed is:

1. Apparatus for use in determining a logic value of a received optical signal which is converted to an electrical signal and amplified by a preamplifier, comprising:

means for matching the DC level of said preamplifier;

means for automatically setting a logic level discriminating threshold; and means responsive to said amplified electrically-converted signal, said matching DC level and said threshold for supplying an output indicative of the logic value of said received optical signal by using feedback from the output of said supplying means via said means for automatically setting a logic level;

wherein said preamplifier and said means for matching each have a transimpedance configuration and each has a Schottkey diode in it feedback path.

2. The invention as defined in claim 1 further wherein said means for matching is a second preamplifier that is substantially the same as said preamplifier.

3. The invention as defined in claim 1 further wherein said means for automatically setting is an automatic threshold controller.

4. The invention as defined in claim 1 further wherein said means for supplying is an operational amplifier.

5. The invention as defined in claim 1 wherein said optical signal is a burst-mode optical signal.

6. The invention as defined in claim 1 wherein said means for matching and said main preamplifier are part of a single integrated circuit.

7. The invention as defined in claim 1 wherein said means for matching, said means for automatically setting a logic level discriminating threshold, and said means for supplying an output are part of a single integrated circuit.

8. The invention as defined in claim 1 wherein said preamplifier and said means for matching each have a clamped transimpedance configuration.

9. Apparatus for use in determining a logic value of a received optical signal which is converted to an electrical signal and amplified by a main preamplifier, comprising:

a tracking preamplifier which matches the DC level of said preamplifier; and an operational amplifier responsive to (i) said amplified electrically-converted signal, (ii) said matching DC level and (iii) an automatically set logic level discriminating threshold for supplying an output indicative of the logic value or said received optical a signal;

wherein said threshold is developed using feedback from an output of said operational amplifier to an input of said operational amplifier via an automatic gain controller and wherein said tracking preamplifier has a transimpedance configuration and a Schottkey diode in its feedback path and said main preamplifier has a transimpedance configuration and a Schottkey diode in its feedback path.

10. The invention as defined in claim 9 wherein said output indicative of the logic value of said received optical signal is in differential form.

11. The invention as defined in claim 10 wherein said tracking preamplifier and said operational amplifier are manufactured as part of a single integrated circuit.

12. The invention as defined in claim 10 wherein said main preamplifier, said tracking preamplifier, and said operational amplifier are manufactured as part of a single integrated circuit.

13. The invention as defined in claim 9 wherein said optical signal is a burst-mode optical signal.

14. The invention as defined in claim 13 wherein said tracking preamplifier has a clamped transimpedance configuration.

15. The invention as defined in claim 14 wherein said preamplifier is clamped using said Schottkey diode in its feedback path.

* * * * *